(12) United States Patent
Koyanaka

(10) Patent No.: US 10,424,122 B2
(45) Date of Patent: Sep. 24, 2019

(54) AUGMENTED REALITY SIMULATION DEVICE WHICH DISPLAYS A VIRTUAL OBJECT ON A MACHINE TOOL AND COMPUTER-READABLE MEDIUM

(71) Applicant: FANUC CORPORATION, Minamitsuru-gun, Yamanashi (JP)

(72) Inventor: Yousuke Koyanaka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 8 days.

(21) Appl. No.: 15/830,493

(22) Filed: Dec. 4, 2017

(65) Prior Publication Data
US 2018/0158247 A1 Jun. 7, 2018

(30) Foreign Application Priority Data
Dec. 6, 2016 (JP) .................................. 2016-236790

(51) Int. Cl.
*G06T 19/00* (2011.01)
*G05B 19/4069* (2006.01)
(Continued)

(52) U.S. Cl.
CPC ............ *G06T 19/006* (2013.01); *B23Q 15/22* (2013.01); *G05B 19/19* (2013.01);
(Continued)

(58) Field of Classification Search
None
See application file for complete search history.

(56) References Cited

U.S. PATENT DOCUMENTS 7,403,648 B2  7/2008  Nakamura
8,175,861 B2  5/2012  Huang et al.
(Continued)

FOREIGN PATENT DOCUMENTS

CN  104035376   9/2014
CN  106066633  11/2016
(Continued)

OTHER PUBLICATIONS

Deepak Bandyopadhyay, Ramesh Raskar, Henry Fuchs, Dynamic Shader Lamps: Painting on Movable Objects, 2001, Proceedings of the IEEE and ACM International Symposium on Augmented Reality, pp. 1-10, DOI: 10.1109/ISAR.2001.970539 (Year: 2001).*
(Continued)

*Primary Examiner* — Michael J Cobb
(74) *Attorney, Agent, or Firm* — Wenderoth, Lind & Ponack, L.L.P.

(57) ABSTRACT

An augmented reality simulation device includes: extension information display means for displaying a virtual object; relation information acquisition means for acquiring first relation information which is information that specifies relation between the virtual object and control axes of a numerical controller and second relation information which is information that specifies settings of the control axes and relation between the control axes; conversion means for converting a movement amount in a first coordinate system which is a coordinate system of the control axis to movement information in a second coordinate system which is a coordinate system for allowing the extension information display means to display the virtual object on the basis of the first relation information and the second relation information; and calculation means for calculating a display position and a display angle of the virtual object based on the (Continued)

movement information in the second coordinate system after the conversion.

6 Claims, 18 Drawing Sheets

(51) Int. Cl.
    *B23Q 15/22*    (2006.01)
    *G05B 19/19*    (2006.01)

(52) U.S. Cl.
    CPC ...... *G05B 19/4069* (2013.01); *B23Q 2716/00* (2013.01); *G05B 2219/35482* (2013.01); *G05B 2219/37193* (2013.01)

(56) References Cited

U.S. PATENT DOCUMENTS

| | | | |
|---|---|---|---|
| 9,049,428 B2 | 6/2015 | Kuroda | |
| 9,501,872 B2 | 11/2016 | Ito | |
| 2004/0107018 A1 | 6/2004 | Nakamura | |
| 2009/0265030 A1* | 10/2009 | Huang | G05B 19/4068 700/182 |
| 2010/0321389 A1* | 12/2010 | Gay | G11B 27/036 345/427 |
| 2011/0183732 A1* | 7/2011 | Block | G06Q 30/02 463/1 |
| 2012/0056992 A1 | 3/2012 | Kuroda | |
| 2015/0022552 A1 | 1/2015 | Ito | |
| 2016/0378861 A1* | 12/2016 | Eledath | G06K 9/00718 707/766 |
| 2018/0077200 A1* | 3/2018 | Apvrille | H04L 63/20 |
| 2018/0251961 A1* | 9/2018 | France | E02F 3/435 |

FOREIGN PATENT DOCUMENTS

| | | |
|---|---|---|
| EP | 3 323 565 | 5/2018 |
| JP | 4083554 | 4/2008 |
| JP | 2012-58968 | 3/2012 |
| JP | 5384178 | 1/2014 |
| JP | 5872923 | 3/2016 |
| JP | 2016-126365 | 7/2016 |
| KR | 10-1563722 | 10/2015 |
| WO | 01/56017 | 8/2001 |

OTHER PUBLICATIONS

Hirokazu Kato et al., "An Augmented Reality System and its Calibration based on Marker Tracking", [online], [Retrieved on Nov. 27, 2016], Internet <URL: http://intron.kz.tsukuba.ac.jp/tvrsj/4.4/kato/p-99_VRSJ4_4.pdf>, Dec. 31, 1999 (abstract, concise explanation and cited in the specification).

Akira Tsutsui et al., "A study of ARToolkKit-based multi-markers", Department of Management Information, Faculty of Management Information, Hannan University, [online], [Retrieved on Nov. 27, 2016], Internet <URL: http://www2.hannan-u.ac.jp/~hanakawa/soturon/2010/TsutsuiYamaoka.pdf>, Jan. 24, 2011 (concise explanation and cited in the specification).

"3-dimensional Transformation Theory, 3-dimensional Affine Transformation", Programming T-shop, [online], [Retrieved on Nov. 27, 2016], Internet <URL: http://www.geocities.co.jp/SiliconValley-Bay/4543/Rubic/Mathematics/Mathematics-3.html> (concise explanation and cited in the specification).

"Euler Angles", Wikipedia (registered trademark), [online], [Retrieved on Nov. 27, 2016], Internet <URL: https://ja.m.wikipedia.org/wiki/オイラー角> (concise explanation and cited in the specification).

Tom Nakada, "3-dimensional Rotation using Quaternion", [online], [Retrieved on Nov. 27, 2016], Internet <URL: http://www015.upp.so-net.ne.jp/notgeld/quaternion.html>, Nov. 25, 2003, (concise explanation and cited in the specification).

Kenji Hiranabe, "3-dimensional Rotational Transform using Quaternion", [online], [Retrieved on Nov. 27, 2016], Internet <URL: http://qiita.com/kenjihiranabe/items/945232fbde58fab45681> (concise explanation and cited in the specification).

Office Action dated Jul. 31, 2019 in corresponding DE Patent Application No. 10 2017 221 678.6.

* cited by examiner

PREPARATION1: DEFINITION OF AR COORDINATE SYSTEM (WORLD, LOCAL COORDINATE SYSTEM) AND REGISTRATION OF VIRTUAL 3D OBJECT

1) COORDINATE SYSTEM HAVING ORIGIN $P_W$ AT MARKER CENTER IS USED AS WORLD COORDINATE SYSTEM

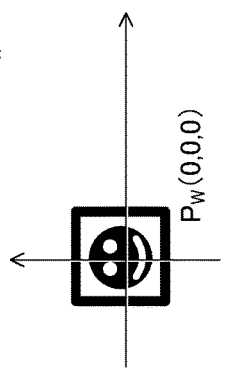

2) COORDINATE SYSTEM HAVING ORIGIN $P_W$ AT MARKER CENTER IS USED AS WORLD COORDINATE SYSTEM

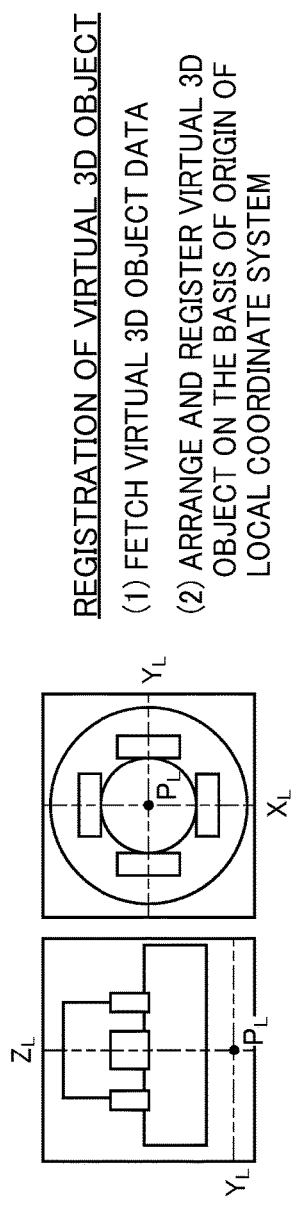

REGISTRATION OF VIRTUAL 3D OBJECT (1) FETCH VIRTUAL 3D OBJECT DATA
(2) ARRANGE AND REGISTER VIRTUAL 3D OBJECT ON THE BASIS OF ORIGIN OF LOCAL COORDINATE SYSTEM

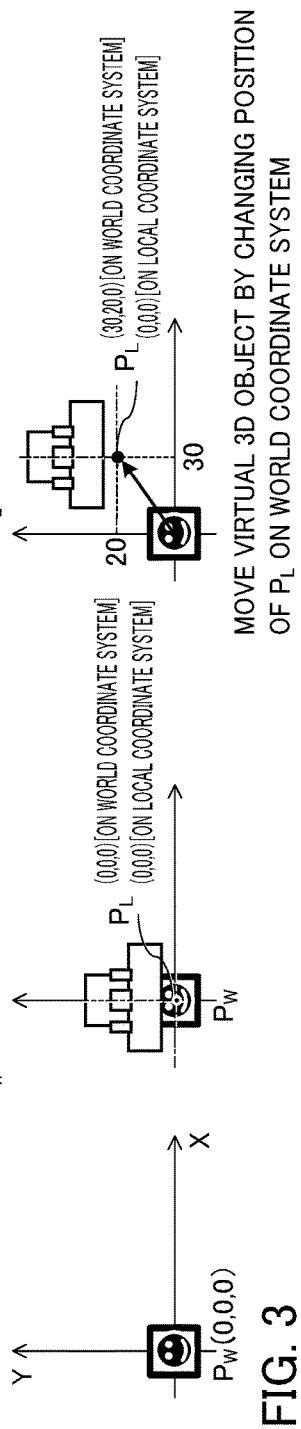

MOVE VIRTUAL 3D OBJECT BY CHANGING POSITION OF $P_L$ ON WORLD COORDINATE SYSTEM

3) RELATION BETWEEN ORIGIN $P_W$ OF WORLD COORDINATE SYSTEM AND ORIGIN $P_L$ OF LOCAL COORDINATE SYSTEM

FIG. 3

PREPARATION2: ARRANGEMENT OF VIRTUAL 3D OBJECT AT INITIAL POSITION

1) PREPARE MARKER FOR DETECTING INITIAL SETTING POSITION IN ADDITION TO MARKER FOR DISPLAYING VIRTUAL 3D OBJECT

FIRST MARKER
· FOR DISPLAYING VIRTUAL 3D OBJECT
· ORIGIN OF WORLD COORDINATE SYSTEM

SECOND MARKER
· FOR DETECTING INITIAL POSITION OF VIRTUAL 3D OBJECT

2) POSITION ROTATION AXIS ON MACHINE TOOL INTERLOCKED WITH VIRTUAL 3D OBJECT AT INITIAL POSITION AND ARRANGE MARKERS $B_{MCN}=0.0$
$C_{MCN}=0.0$

3) POSITION ROTATION AXIS ON MACHINE TOOL INTERLOCKED WITH VIRTUAL 3D OBJECT AT INITIAL POSITION AND ARRANGE MARKERS

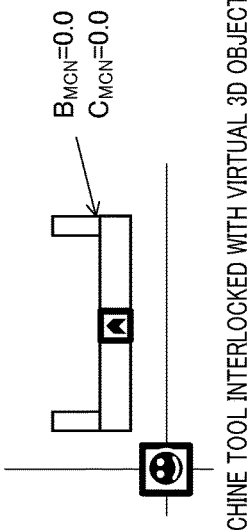

(xd, yd, zd)

4) DISPLAY VIRTUAL 3D OBJECT ON FIRST MARKER AND MOVE BY INTER-MARKER DISTANCE
(MOVE ORIGIN OF LOCAL COORDINATE SYSTEM ON WORLD COORDINATE SYSTEM)

DISPLAY (PROJECT)

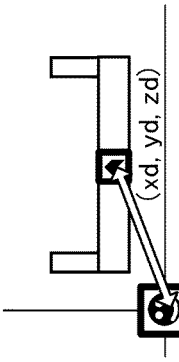

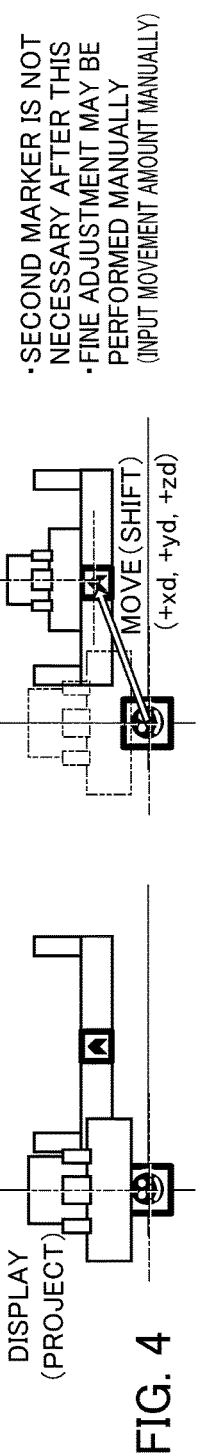

MOVE (SHIFT)
(+xd, +yd, +zd)

· SECOND MARKER IS NOT NECESSARY AFTER THIS
· FINE ADJUSTMENT MAY BE PERFORMED MANUALLY (INPUT MOVEMENT AMOUNT MANUALLY)

FIG. 4

FIG. 6
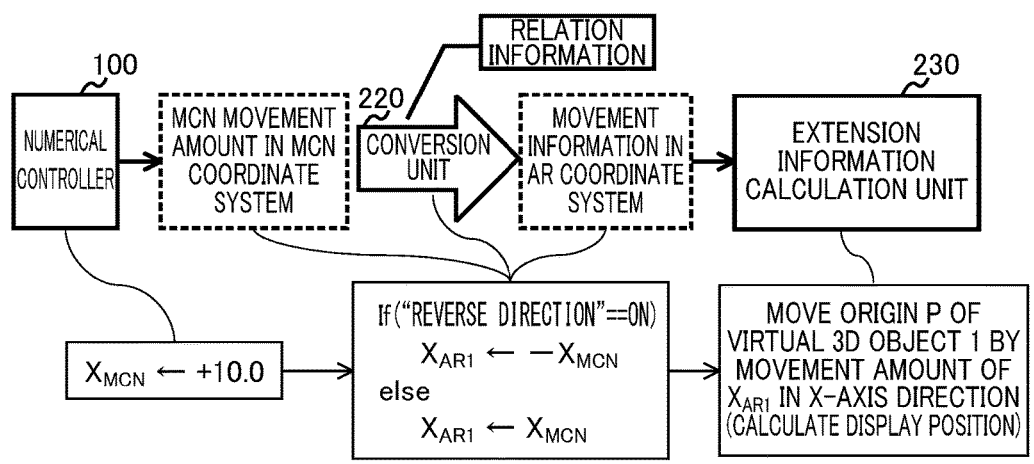
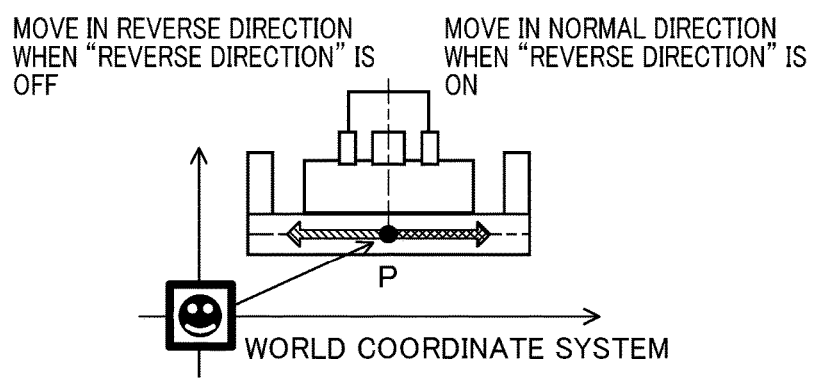
MOVE IN REVERSE DIRECTION
WHEN "REVERSE DIRECTION" IS
OFF
MOVE IN NORMAL DIRECTION
WHEN "REVERSE DIRECTION" IS
ON

EXAMPLE OF RELATION INFORMATION SETTING SCREEN

| VIRTUAL 3D OBJECT | COORDINATE | TARGET AXIS | LINEA/ROTATION | REFERENCE AXIS | MASTER AXIS | REVERSE DIRECTION |
|---|---|---|---|---|---|---|
| OBJECT1 | X: | — | — | — | — | |
| | Y: | — | — | — | — | |
| | Z: | Z1 | LINEA | Z | — | |
| | A: | — | — | — | — | |
| | B: | — | — | — | — | |
| | C: | — | — | — | — | |
| OBJECT2 | X: | X1 | LINEA | X | — | |
| | Y: | Y1 | LINEA | Y | — | |
| | Z: | — | — | — | — | |
| | A: | — | — | — | — | |
| | B: | B1 | ROTATION | Y | — | |
| | C: | C1 | ROTATION | Z | B1 | |
| OBJECT3 | X: | X1 | LINEA | X | — | |
| | Y: | Y1 | LINEA | Y | — | |
| | Z: | — | — | — | — | |
| | A: | — | — | — | — | |
| | B: | B1 | ROTATION | Y | — | |
| | C: | — | — | — | — | |

MARKER COORDINATE SYSTEM IMAGE

AUGMENTED REALITY SIMULATION DEVICE WHICH DISPLAYS A VIRTUAL OBJECT ON A MACHINE TOOL AND COMPUTER-READABLE MEDIUM

This application is based on and claims the benefit of priority from Japanese Patent Application No. 2016-236790, filed on 6 Dec. 2016, the content of which is incorporated herein by reference.

BACKGROUND OF THE INVENTION

Field of the Invention

The present invention relates to an augmented reality simulation device and a computer readable medium for performing simulation using an augmented reality technology.

Related Art

Conventionally, in the field of a machine tool controlled by a numerical controller, a work or a jig is designed by a computer-aided design (CAD) or the like. Moreover, a machining program for machining a work using a designed jig is created. A numerical controller controls a machine tool on the basis of a machining program whereby machining of a work is realized.

Here, machining simulation is generally performed to check whether a designed jig or work and a machining program are appropriate before the jig or work and the machining program are actually loaded on a manufacturing line.

When this machining simulation is performed to check operations of a real machine, machining simulation is naturally not performed until a real jig is completed. Therefore, it causes a problem that the process is delayed until a jig is completed.

Moreover, when a problem such as interference is found at the time of checking operations after a jig is completed and it is necessary to change the design of the jig, the process is delayed further. Moreover, the cost for changing the jig design also incurs. If the jig design is not changed, it is necessary to change the machining program. In this case, the cycle time required for machining may be extended more than as expected.

With these problems in view, a technology of performing machining simulation virtually by arithmetic processing of such as a personal computer rather than checking operations of a real machine is known. For example, in a technology disclosed in Patent Document 1, all structures of a machine tool are realized as virtual 3D objects and machining simulation is performed.

However, in the technology disclosed in Patent Document 1, it is necessary not only to create a virtual 3D object of a work or a jig and but also to create virtual 3D objects of an entire machine of each of a plurality of types of machine tools. Moreover, in order to reproduce operations of a real machine tool, it is necessary to implement an operation processing feature on a virtual 3D object of a movable part of the machine tool. That is, there is a problem that it is not easy to create a virtual 3D object.

Furthermore, there is a problem that, even when the virtual 3D object is created in this manner, when the reproducibility of the virtual 3D object is low, the reproduced virtual 3D object may be different from the reality.

A technology which addresses problems regarding such a virtual 3D object is disclosed in Patent Document 2. In the technology disclosed in Patent Document 2, images of the inside of a machine tool are captured by a camera to extract a tool holding part or a work holding part registered in advance as characteristic points. Moreover, a virtual 3D object of a tool or a work registered in advance is displayed on an image of a machine tool captured actually as an overlay on the basis of the positions of the characteristic points. By doing so, it is not necessary to create a virtual 3D object of the machine tool.

However, in the technology disclosed in Patent Document 2, since it is necessary to fix a capturing direction of a camera to a predetermined direction, there is a problem that it is difficult to change a view point from which the state of machining simulation is ascertained.

On the other hand, in the field of recent image processing technologies, an augmented reality technology called augmented reality (AR) or mixed reality (MR) for, such as displaying virtual objects so as to be superimposed on objects present in a real space is generally used. In the following description, information displayed by such an augmented reality technology will be referred to as "extension information".

When such an augmented reality technology is used, it is possible to extract specific characteristic points (for example, markers) of an image captured by a camera and to display extension information such as virtual 3D objects as an overlay. Moreover, it is possible to change optionally a capturing direction of a camera. Therefore, if such an augmented reality technology can be used appropriately, it is possible to solve the problems of the technology disclosed in Patent Document 2.

A basic technology of such an augmented reality technology such as AR or MR is disclosed in Non-Patent Document 1. In the technology disclosed in Non-Patent Document 1, a see-through-type head-mounted display (HMD) is used as a display device, and a 3-dimensional position of a marker serving as reference coordinates for displaying virtual objects is detected from image information obtained by a small camera attached to the HMD. A video image of a virtual object which gives a parallax to both eyes of a user is presented so that a virtual 3D object can be displayed as a 3-dimensional object in a real 3-dimensional space seen through a HMD screen.

Specifically, in the technology disclosed in Non-Patent Document 1, a plurality of coordinate systems illustrated in FIG. 15 is employed. In this respect, a virtual 3D object is represented on a marker coordinate system which is a coordinate system having the origin as a characteristic point. Moreover, a process of calculating a coordinate transformation matrix for transforming a marker coordinate system to a camera coordinate system is performed.

By using the coordinate transformation matrix obtained by this process, it is possible to draw a virtual 3D object at an appropriate position of the screens on the left and right sides of a HMD.

By using such an augmented reality technology disclosed in Non-Patent Document 1 and the like, it is possible to display a virtual 3D object inside a real machine tool and to perform machining simulation.

For example, as illustrated in FIG. 16, when a characteristic point is a marker registered in advance, a virtual 3D object moves following movement of the marker. That is, the virtual 3D object follows the marker.

By disposing a marker on a movable part of a real machine tool using this technology, it is possible to move a virtual 3D object so as to follow actual movement of a table. For example, as indicated by (17A) on the left side of FIG. 17, a marker is disposed on a movable table which is a movable part of a real machine tool. Moreover, as indicated by (17B) at the center of FIG. 17, a virtual 3D object is displayed using the marker as the origin. Furthermore, as indicated by (17C) on the right side of FIG. 17, when the movable table is moved along an X-axis, for example, the virtual 3D object follows the marker.

By doing so, it is possible to perform machining simulation without realizing the entire machine tool as a virtual 3D object and reproducing a movable part of the machine tool.

Patent Document 1:
Japanese Patent No. 4083554
Patent Document 2:
Japanese Patent No. 5384178
Patent Document 3:
Japanese Unexamined Patent Application, Publication No. 2012-58968
Patent Document 4:
Japanese Patent No. 5872923
Non-Patent Document 1:
"An Augmented Reality System and its Calibration based on Marker Tracking", [online], [Retrieved on Nov. 27, 2016]
Non-Patent Document 2:
"A study of ARToolkKit-based multi-markers", Department of Management Information, Faculty of Management Information, Hannan University, Akira Tsutsui and Daisuke Yamaoka, [online], [Retrieved on Nov. 27, 2016]
Non-Patent Document 3:
"3-dimensional Transformation Theory, 3-dimensional Affine Transformation", Programming T-shop, [online], [Retrieved on Nov. 27, 2016]
Non-Patent Document 4:
"Euler Angles", Wikipedia (registered trademark), [online], [Retrieved on Nov. 27, 2016]
Non-Patent Document 5:
"3-dimensional Rotation using Quaternion", Toru Nakada, [online], [Retrieved on Nov. 27, 2016]
Non-Patent Document 6:
"3-dimensional Rotational Transform using Quaternion", Kenji Hiranabe, [online], [Retrieved on Nov. 27, 2016]

SUMMARY OF THE INVENTION

However, when a marker is disposed on a machining program of a real machine tool as illustrated in FIG. 17, a plurality of problems as illustrated in FIG. 18 arises.

For example, there is a problem that it is unable to identify the marker as indicated by (18A) on the left side of FIG. 18. This is because although it is necessary to identify a marker using a camera in order to draw extension information, it may be unable to identify the marker due to movement or rotation of a movable part on which the marker is disposed. In this respect, when the technology disclosed in Patent Document 4 is used, it is possible to continue displaying extension information even after it became unable to identify the marker. However, in the technology disclosed in Patent Document 4, since it is not possible to detect movement of the marker disposed on the movable part after it became unable to identify the marker, the extension information being displayed does not move after it became unable to identify the marker. Therefore, even when the technology disclosed in Patent Document 4 is used, it is not possible to perform machining simulation appropriately if it is unable to identify the marker.

Moreover, as indicated by (18B) at the center of FIG. 18, there is a problem that the moving speed of a movable part is too fast to recognize the marker.

Moreover, as indicated by (18C) on the right side of FIG. 18, there is a problem that it may be unable to dispose the marker on the movable part, in the first place. A case in which it is unable to dispose the marker on the movable part is a case in which the movable part itself is realized as a virtual 3D object, for example.

Moreover, a case in which a plurality of virtual 3D objects is disposed on one marker may be considered. For example, a case in which as indicated by (19A) on the left side of FIG. 19, a work and a jig, and a tool are displayed as virtual 3D objects may be considered. Moreover, a case in which as indicated by (19B) on the right side of FIG. 19, a work and a jig, and a table are displayed as virtual 3D objects may be considered. In such a case, there is a problem that, if a marker is disposed on a movable part, virtual 3D objects which do not need to move also move.

In consideration of these problems, it is preferable that, when machining simulation is performed on a machine tool, a marker is fixedly placed at a predetermined position without moving the marker itself.

However, when the marker is fixedly placed, a virtual 3D object displayed using the marker as the origin does not move. In this case, it is not possible to perform machining simulation.

Therefore, when the marker is fixedly placed, it is necessary to move and rotate a virtual 3D object on a marker coordinate system (hereinafter referred to as an "AR coordinate system") following movement of a movable part of a machine tool.

In contrast, a movable part of a real machine tool moves and rotates by operations of a control axis controlled by a numerical controller. A control axis coordinate system (hereinafter referred to as an "MCN coordinate system") is managed by a numerical controller and is unique to each machine tool.

That is, an AR coordinate system and an MCN coordinate system are independent coordinate systems, and it is not possible to perform machining simulation correctly when a virtual 3D object is moved and rotated just according to an operation (a movement amount) in the control axis.

This will be described with reference to a specific example illustrated in FIG. 20. As indicated by (20A) on the left side of FIG. 20, a C-axis is mounted on a B-axis of a real machine tool. Therefore, as indicated by (20B) at the center of FIG. 20, when the B-axis is rotated, a rotation axis direction of the C-axis is also changed.

As indicated by (20C) on the right side of FIG. 20, when the C-axis is rotated from this state, since the rotation axis direction of the C-axis is changed with rotation of the B-axis in the MCN coordinate system managed by the numerical controller, it is possible to perform rotation of the C-axis as expected.

In contrast, since the AR coordinate system does not have information for performing control such that, when the B-axis roates, the rotation axis direction of the C-axis is changed, the rotation axis direction of the C-axis is not changed without being influenced by rotation of the B-axis. Therefore, in the AR coordinate system, if a rotational movement amount of the C-axis only is delivered, wrong rotational movement is achieved unexpectedly.

In general technology described above, it is difficult to perform various simulations like machining simulation using an augmented reality technology appropriately.

Therefore, an object of the present invention is to provide an augmented reality simulation device and an augmented reality simulation program capable of performing simulation using an augmented reality technology appropriately.

(1) An augmented reality simulation device (for example, a numerical controller 100 to be described later) according to the present invention includes: extension information display means (for example, a head-mounted display 300 to be described later) for displaying a virtual object (for example, a virtual 3D object to be described later) so as to be superimposed on a real machine tool; relation information acquisition means (for example, a relation information acquisition unit 210 to be described later) for acquiring first relation information which is information that specifies relation between the virtual object and control axes of a numerical controller that controls the machine tool and second relation information which is information that specifies settings of the control axes themselves and relation between the control axes; conversion means (for example, a conversion unit 220 to be described later) for converting a movement amount in a first coordinate system which is a coordinate system of the control axis to movement information in a second coordinate system which is a coordinate system for allowing the extension information display means to display the virtual object on the basis of the first relation information and the second relation information; and calculation means (for example, an extension information calculation unit 230) for calculating a display position and a display angle of the virtual object on the basis of the movement information in the second coordinate system after the conversion, wherein the extension information display means displays the virtual object on the basis of a calculation result of the calculation means.

(2) In the augmented reality simulation device according to (1), when the numerical controller operates the machine tool by transmitting the movement amount in the first coordinate system to the machine tool, the conversion means may perform the conversion on the basis of the same movement amount as the movement amount in the first coordinate system transmitted to the machine tool, and the virtual object may be displayed so as to be interlocked with operations of the machine tool.

(3) In the augmented reality simulation device according to (1) or (2), the calculation means may calculate a distance between a first characteristic point which is the origin of the second coordinate system and a second characteristic point disposed at a machining simulation starting position of the virtual object, calculate movement information for moving the display position of the virtual object to the second characteristic point on the basis of the calculated distance, and calculate the display position of the virtual object on the basis of the calculated movement information and the movement information in the second coordinate system converted by the conversion means.

(4) In the augmented reality simulation device according to any one of (1) to (3), when a plurality of the virtual objects are displayed at the origin of the second coordinate system, the respective virtual objects may have different pieces of the first relation information.

(5) In the augmented reality simulation device according to any one of (1) to (4), when a plurality of virtual objects are displayed at different positions, the calculation means may specify the position of a third characteristic point in the second coordinate system on the basis of the distance between the first characteristic point which is the origin of the second coordinate system and the third characteristic point disposed at a position different from the first characteristic point, and the calculation means may calculate a display position of the first virtual object on the basis of the position of the first characteristic point and calculate the position of the third characteristic point in the second coordinate system as the display position of the second virtual object.

(6) An augmented reality simulation program according to the present invention is an augmented reality simulation program for causing a computer to function as an augmented reality simulation device (for example, a numerical controller 100 to be described later), the augmented reality simulation program causing the computer to function as the augmented reality simulation device including: extension information display means (for example, a head-mounted display 300 to be described later) for displaying a virtual object (for example, a virtual 3D object to be described later) so as to be superimposed on a real machine tool; relation information acquisition means (for example, a relation information acquisition unit 210 to be described later) for acquiring first relation information which is information that specifies relation between the virtual object and control axes of a numerical controller that controls the machine tool and second relation information which is information that specifies settings of the control axes themselves and relation between the control axes; conversion means (for example, a conversion unit 220 to be described later) for converting a movement amount in a first coordinate system which is a coordinate system of the control axis to movement information in a second coordinate system which is a coordinate system for allowing the extension information display means to display the virtual object on the basis of the first relation information and the second relation information; and calculation means (for example, an extension information calculation unit 230) for calculating a display position and a display angle of the virtual object on the basis of the movement information in the second coordinate system after the conversion, wherein the extension information display means displays the virtual object on the basis of a calculation result of the calculation means.

According to the present invention, it is possible to perform simulation using an augmented reality technology appropriately.

BRIEF DESCRIPTION OF THE DRAWINGS

FIG. 3 is a diagram (1/2) illustrating preparation according to an embodiment of the present invention.

FIG. 4 is a diagram (2/2) illustrating preparation according to an embodiment of the present invention.

FIG. 6 is a diagram (1/2) illustrating conversion of a conversion unit according to an embodiment of the present invention.

DETAILED DESCRIPTION OF THE INVENTION

Figure 1:
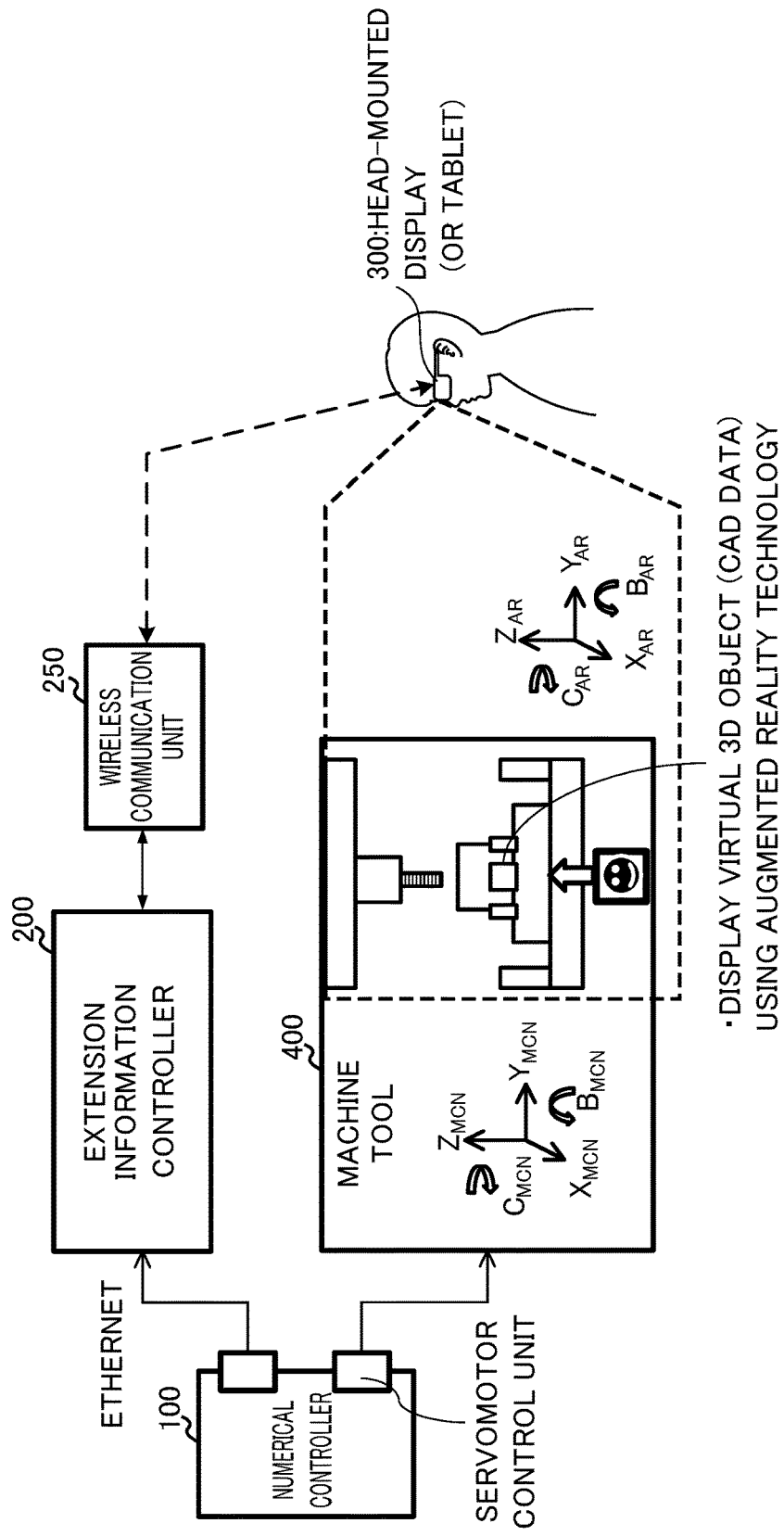
FIG. 1 is a block diagram illustrating a basic configuration of an entire embodiment of the present invention.

Hereinafter, an embodiment of the present invention will be described with reference to the drawings. First, an entire configuration of the present embodiment will be described with reference to FIG. 1.

The present embodiment includes a numerical controller 100, an extension information controller 200, a wireless communication unit 250, a head-mounted display 300, and a machine tool 400.

The numerical controller 100 is a device having the function of a general numerical controller and a function of performing communication with the extension information controller 200. The numerical controller 100 is communicably connected to the machine tool 400. The numerical controller 100 controls the machine tool 400 according to a movement amount in an MCN coordinate system output on the basis of a machining program incorporated into the numerical controller 100 itself to machine a work.

Moreover, the numerical controller 100 is also communicably connected to the extension information controller 200. The numerical controller 100 also outputs a movement amount in the MCN coordinate system output on the basis of the machining program to the extension information controller 200. In this way, the numerical controller 100 outputs the movement amount to both the machine tool 400 and the extension information controller 200. In this respect, the output of the movement amount from the numerical controller 100 to the extension information controller 200 may be performed in synchronization with the output of the movement amount from the numerical controller 100 to the machine tool 400 and may be performed asynchronously. Moreover, the numerical controller 100 also outputs "relation information between control axes as well as settings of control axes themselves" to the extension information controller 200.

The extension information controller 200 is a device unique to the present embodiment and performs control for displaying a virtual 3D object (a virtual object) appropriately by calculating a display position and a display angle of the virtual 3D object using an augmented reality technology. The detailed configuration of the extension information controller 200 will be described later with reference to FIG. 2.

The wireless communication unit 250 is communicably connected to the extension information controller 200 and acquires the virtual 3D object output by the extension information controller 200 and a display position and a display angle of the virtual 3D object. These pieces of information output by the extension information controller 200 correspond to an AR coordinate system. These pieces of information output by the extension information controller 200 are transmitted to the head-mounted display 300 according to a wireless communication standard such as Wi-Fi.

Moreover, the wireless communication unit 250 receives information acquired by images captured by a camera included in the head-mounted display 300 from the head-mounted display 300 by wireless communication. The wireless communication unit 250 outputs the received information to the extension information controller 200.

The head-mounted display 300 is a general head-mounted display (hereinafter referred to appropriately as an "HMD") and acquires the virtual 3D object output by the extension information controller 200 and the display position and the display angle thereof via the wireless communication unit 250. The virtual 3D object is displayed on a display included in the head-mounted display 300 itself on the basis of the acquired information. The acquired information corresponds to the AR coordinate system as described above. Moreover, the head-mounted display 300 outputs the information acquired by images captured by the camera included in the head-mounted display 300 itself to the extension information controller 200 via the wireless communication unit 250.

The machine tool 400 is a general machine tool and moves and rotates the control axis according to a movement amount in the MCN coordinate system output from the numerical controller 100.

In the present embodiment, with such a configuration, a user refers to the virtual 3D object displayed in correspondence to the AR coordinate system from the display of the head-mounted display 300 and refers to an actual structure of the machine tool 400 operating in correspondence to the MCN coordinate system over the display. In this way, the user can observe the state of machining simulation. That is, it is possible to attain the above-described object that simulation can be performed using an augmented reality technology appropriately.

The configuration illustrated in FIG. 1 is an example only. For example, the head-mounted display 300 may be realized by a tablet terminal rather than an HMD. Moreover, a portion or all of the functions of the extension information controller 200 may be mounted on the head-mounted display 300. Furthermore, respective communication connections may be cable connection or wireless connection. For example, although the drawing illustrates an example in which a communication connection between the numerical controller 100 and the extension information controller 200 is realized by cable connection compliant to the Ethernet (registered trademark), such a connection may be wireless connection. Furthermore, in the following description, although a virtual 3D object is displayed as extension information, this is an example for description only and the application of the present embodiment is not limited to the virtual 3D object. For example, in the present embodiment, a virtual 2D object may be displayed as extension information.

Figure 2:
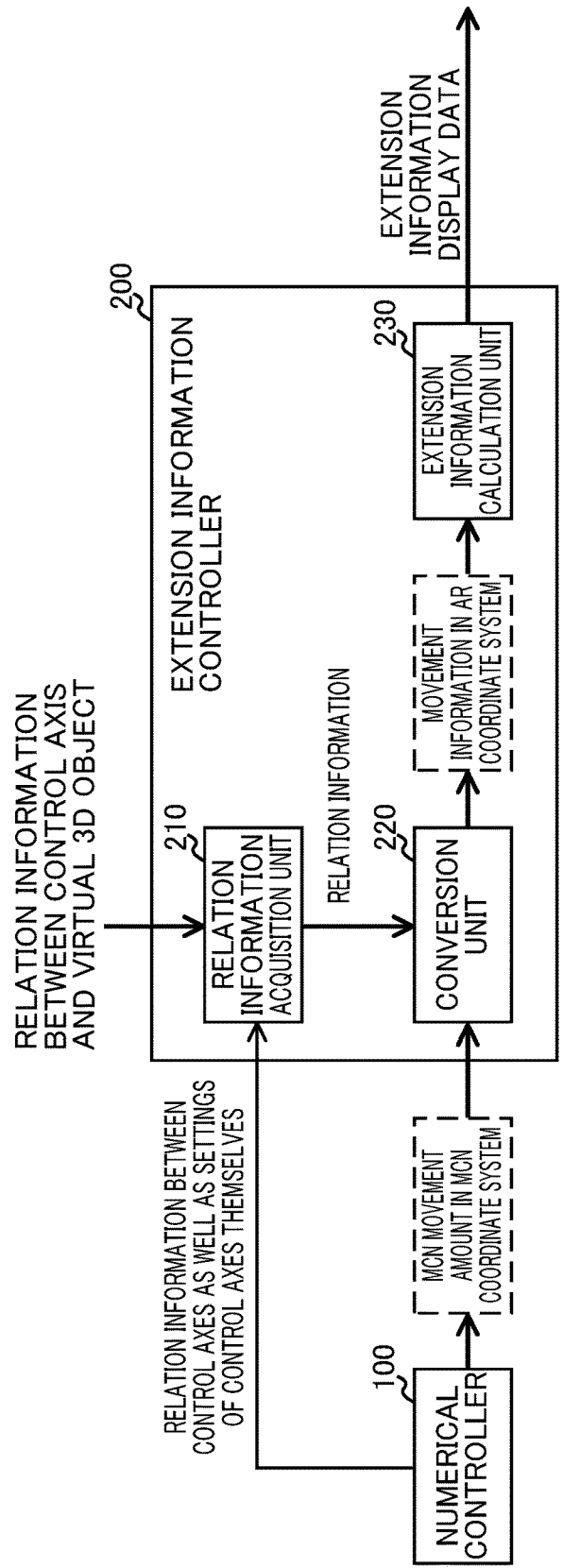
FIG. 2 is a block diagram illustrating a basic configuration of an extension information controller according to an embodiment of the present invention.

Next, a detailed configuration of the extension information controller 200 will be described with reference to FIG. 2. Referring to FIG. 2, the extension information controller 200 includes a relation information acquisition unit 210, a conversion unit 220, and an extension information calculation unit 230.

The relation information acquisition unit 210 is a portion that acquires relation information which is information for allowing the conversion unit 220 to be described later to perform processes. The relation information acquired by the relation information acquisition unit 210 includes two types of information. First, the relation information acquisition unit 210 acquires "relation information between control axes as well as settings of control axes themselves" from the numerical controller 100 as first relation information.

Figure 11:
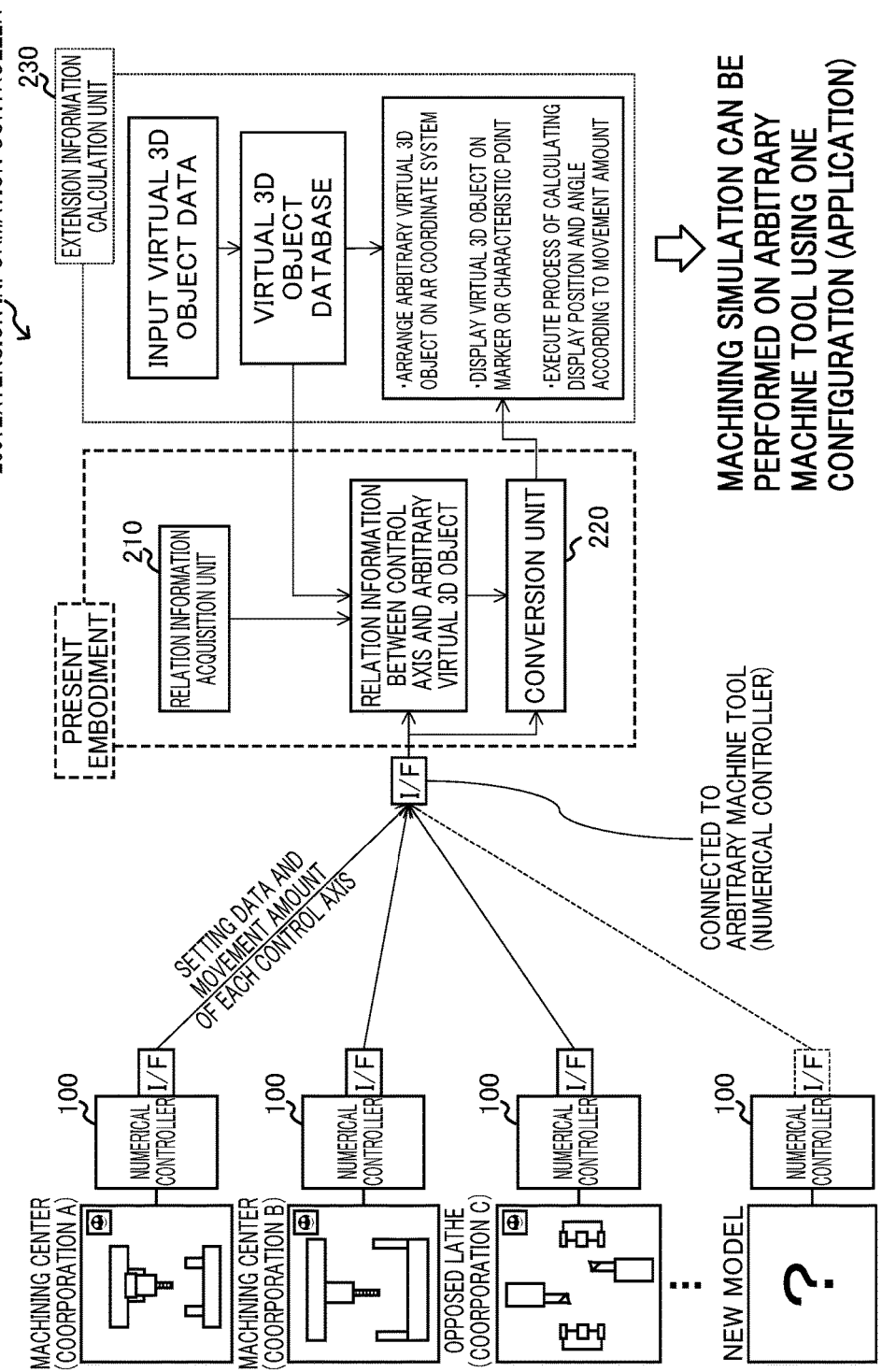
FIG. 11 is a diagram (2/2) for describing one of advantages of an embodiment of the present invention.

Moreover, the relation information acquisition unit 210 acquires "relation information between control axis and virtual 3D object" as second relation information. This relation information is set on the basis of a user's operation. A setting method will be described later with reference to FIG. 11 and the like. The relation information acquisition unit 210 outputs the acquired respective pieces of relation information to the conversion unit 220.

The conversion unit 220 is a portion that converts a movement amount in the MCN coordinate system input from the numerical controller 100 to movement information in the AR coordinate system on the basis of the relation information input from the relation information acquisition unit 210. The movement information in the AR coordinate system after conversion is output to the extension information calculation unit 230.

The extension information calculation unit 230 is a portion for displaying the extension information according to an augmented reality technology. The extension information calculation unit 230 has a database (not illustrated) of virtual 3D objects inside or outside the extension information calculation unit 230. The extension information calculation unit 230 generates "extension information display data" for displaying a virtual 3D object selected from the database in correspondence to the movement information in the AR coordinate system input from the conversion unit 220. The extension information display data includes a shape or the like of the virtual 3D object, a display position and a display angle of the virtual 3D object, and the like. The extension information calculation unit 230 outputs the generated extension information display data to the head-mounted display 300 via the wireless communication unit 250.

The head-mounted display 300 displays a virtual 3D object on the basis of respective pieces of information included in the extension information display data as described above.

The extension information controller 200 can be realized by incorporating software unique to the present embodiment into a general server device or a personal computer.

More specifically, the extension information controller 200 includes an arithmetic processing device such as a central processing unit (CPU). Moreover, the extension information controller 200 includes an auxiliary storage device such as a hard disk drive (HDD) or a solid state drive storing various programs and a main storage device such as a random access memory (RAM) for storing data which is temporarily necessary for the arithmetic processing device to execute programs.

Moreover, in the extension information controller 200, the arithmetic processing device reads various programs from the auxiliary storage device and performs an arithmetic process based on these programs while loading the read programs onto the main storage device.

The functions of the above-described functional blocks are realized by controlling hardware components included in the extension information controller 200 on the basis of the arithmetic processing result. That is, the present embodiment can be realized by cooperation of software and hardware.

Next, the processes of the respective functional blocks included in the extension information controller 200 will be described with reference to the drawings. First, a preparation process performed in a previous stage of displaying a virtual 3D object will be described with reference to FIGS. 3 and 4.

In the following description, a world coordinate system and a local coordinate system are used. Here, the world coordinate system is a coordinate system which uses a marker center as the origin $P_W$ as illustrated in Item 1) of FIG. 3.

Moreover, the local coordinate system is a coordinate system which uses the center of rotation of a virtual 3D object as the origin $P_L$ as illustrated in Item 2) of FIG. 3. The extension information calculation unit 230 of the extension information controller 200 fetches virtual 3D object data. Rotational movement of a virtual 3D object about the origin $P_L$ of the local coordinate system is performed according to the movement information in the rotation direction calculated by the extension information calculation unit 230.

Moreover, the extension information calculation unit 230 arranges and registers the fetched virtual 3D object on the world coordinate system on the basis of the origin $P_L$ of the local coordinate system. As illustrated in Item 3) in FIG. 3, the display position of the virtual 3D object can be moved according to a coordinate value of the origin $P_L$ of the local coordinate system on the world coordinate system. That is, linear movement of the virtual 3D object is performed by updating the coordinate value of the origin $P_L$ of the local coordinate system on the world coordinate system according to the movement information in a linear direction calculated by the extension information calculation unit 230.

Figure 18:
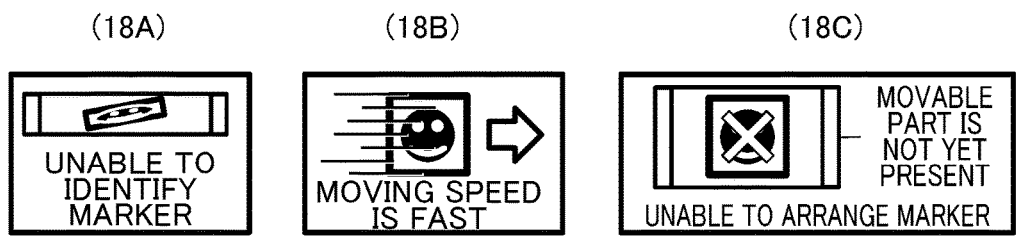
FIG. 18 is a diagram illustrating a problem when a marker is placed on a movable part.
Figure 19:
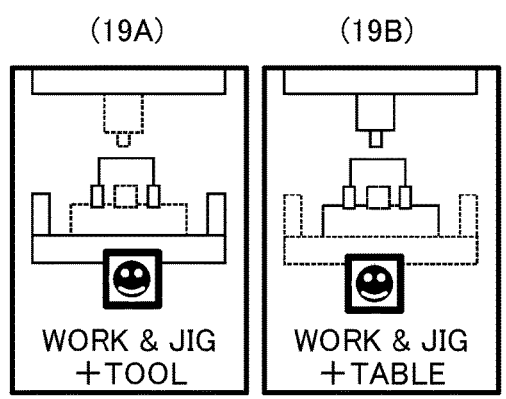
FIG. 19 is a diagram illustrating a case in which a plurality of virtual 3D objects is correlated with a marker.

Here, in the present embodiment, the marker is not placed on a movable part in which a virtual 3D object is to be disposed actually but is fixedly placed at a position which is away from the movable part and at which the marker can be captured by the camera of the HMD. This is to solve the problem occurring when the marker is placed on a movable part as described with reference to FIGS. 18 and 19.

However, an initial display position of the virtual 3D object corresponds to an arrangement position of the marker at the time of activating the extension information controller 200. In this case, the initial display position is shifted from a machining simulation starting position of the virtual 3D object and the virtual 3D object is disposed away from the marker.

Therefore, it is necessary to eliminate this shift. In this respect, in order to eliminate this shift, a user may eliminate the shift by manually operating the marker, for example. For example, the user may operate an operating unit (not illustrated) included in the extension information controller 200 to perform adjustment so that the shift is eliminated while referring to the virtual 3D object displayed on the display of the HMD. The operating unit included in the extension information controller 200 is a keyboard, a mouse, or the like, for example, connected to a personal computer when the extension information controller 200 is realized by a personal computer.

However, adjustment may be performed so that the shift is eliminated automatically without requiring the user's manual adjustment by taking the user's convenience into consideration. An example of the adjustment method will be described with reference to FIG. 4.

As illustrated in FIG. 4, in this example, two markers: first and second markers are prepared. Here, the first marker is the same marker as described with reference to FIG. 3 and is a marker for displaying a virtual 3D object as illustrated in Item 1) of FIG. 4. The first marker corresponds to the origin of the world coordinate system.

On the other hand, as illustrated in Item 1) of FIG. 4, the second marker is a marker for detecting a machining simulation starting position of a virtual 3D object. The first and second markers have different designs or different shapes so that the extension information controller 200 can distinguish and identify the two markers.

As illustrated in Item 2) of FIG. 4, a rotation axis (MCN coordinate system) on a machine tool interlocked with a virtual 3D object is positioned at an initial position, and the second marker is disposed at a machining simulation starting position of the virtual 3D object so that the second marker can be captured by the camera of the HMD. On the other hand, the first marker is disposed at a position at which the first marker can be always captured by the camera of the HMD.

Subsequently, as illustrated in Item 3) of FIG. 4, the extension information controller 200 is activated. On the other hand, the first and second markers are captured by the camera of the head-mounted display 300. The head-mounted display 300 transmits image data obtained by capturing to the extension information controller 200 via the wireless communication unit 250.

The activated extension information controller 200 detects the respective markers on the basis of the image data transmitted from the head-mounted display 300 and calculates the distance between the markers as an initial process. The technology disclosed in Non-Patent Document 2 or the like, for example, may be used to perform this process.

Subsequently, as illustrated in Item 4) of FIG. 4, when the virtual 3D object is displayed on the first marker, the origin $P_L$ of the local coordinate system is moved on the world coordinate system using the inter-marker distance as movement information. In this way, it is possible to display the virtual 3D object on a machining simulation starting position of the virtual 3D object on a machine tool interlocked with the virtual 3D object. Since it is not necessary to perform adjustment using the second marker after this, the second marker may be removed from the machine tool.

By doing so, the first marker can be fixedly placed at a position at which the first marker can be captured by the camera of the head-mounted display 300. When additional fine adjustment is required, the user's manual adjustment may be combined. Next, acquisition of "relation information between control axis and virtual 3D object" by the relation information acquisition unit 210 will be described with reference to FIG. 5.

In the present embodiment, it is assumed that the relation information acquisition unit 210 allows the user to set the relation between the virtual 3D object and the control axis managed by the numerical controller 100 on a dedicated setting screen. Therefore, the relation information acquisition unit 210 outputs such a user interface as illustrated as the relation information setting screen in FIG. 5 to the user.

On this user interface, the setting of the relation between the control axis and the virtual 3D object is received from the user. In this way, the relation information acquisition unit 210 can acquire the relation information between the control axis and the virtual 3D object. This user interface will be described.

First, "Item: 1" in the drawing is information that identifies a virtual 3D object. In the present embodiment, setting is performed on respective virtual 3D objects in a virtual 3D object database stored in the extension information calculation unit 230. A setting target virtual 3D object is selected from a list of virtual 3D objects, for example.

"Item: 2" in the drawing is information indicating moving directions and rotation directions of the AR coordinate system of a present setting target virtual 3D object. The moving direction is represented by three orthogonal axes X, Y, and Z. Moreover, A indicates a rotation direction around the X-axis. Similarly, B indicates a rotation direction around the Y-axis and C indicates a rotation direction around the Z-axis.

"Item: 3" in the drawing is a portion for selecting an axis and a rotation direction corresponding to each moving direction and each rotation direction in the AR coordinate system from the control axis (denoted by "target axis" in the drawing) managed by the numerical controller 100. The selectable control axis is managed on the basis of the MCN coordinate system by the numerical controller 100. Due to this, a list of selectable control axes can be acquired from the numerical controller 100. Moreover, the control axis is selected by the user.

For example, in the example illustrated in the drawing, a control axis X1 of the MCN coordinate system is selected as an axis corresponding to the X-axis of the AR coordinate system. However, this is an example only, and for example, a control axis Y1 of the MCN coordinate system may be selected as the axis corresponding to the X-axis of the AR coordinate system. These correlations are different from one virtual 3D object to another. For directions where no movement occurs, no selection is made (denoted by "-" in the drawing).

"Item: 4" in the drawing is a portion that displays information of the control axis selected in "Item: 3" in the drawing. This information is automatically determined in accompany with the control axis selected in "Item: 3" and is displayed for user's ascertainment.

Specifically, it is described whether the control axis performs linear movement or rotational movement. Moreover, a reference axis is described. For example, when the control axis is X1, linear movement is performed along the X-axis. Moreover, when the control axis is B1, rotational movement is performed around the Y-axis.

Moreover, the moving direction or the rotation axis direction is changed depending on the position of an axis displayed in "Master axis". For example, since the master axis of C1 is B1, the moving direction or the rotation axis direction is changed depending on the position of B1.

"Reverse direction" in "Item: 5" is an item in which a user fills a check mark when the moving direction in the AR coordinate system is a reverse direction. When a check mark is filled in the item, reverse movement is performed in the AR coordinate system. Among the respective items described above, the "Item: 3" and "Item: 5" are set by the user.

Figure 5:
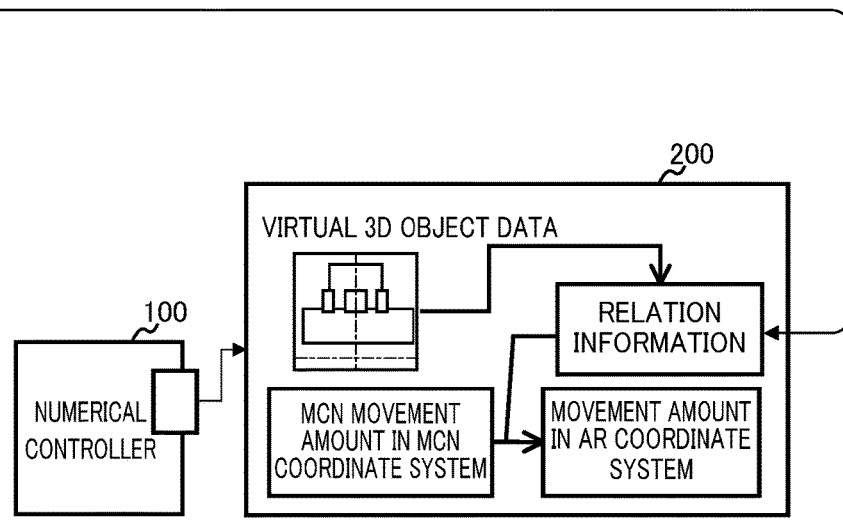
FIG. 5 is a diagram illustrating an example of a relation information setting screen according to an embodiment of the present invention.

As illustrated in FIG. 2, the relation information acquisition unit 210 also acquires "relation information between control axes as well as settings of control axes themselves". Indeed, the settings of control axes themselves and the relation information between control axes are already set in the numerical controller 100 side, and the relation information acquisition unit 210 can acquire the same from the numerical controller 100 and use the same as they are. Therefore, it is not necessary to set the settings of control axes themselves and the relation information between control axes on such a dedicated setting screen as illustrated in FIG. 5.

Figure 7:
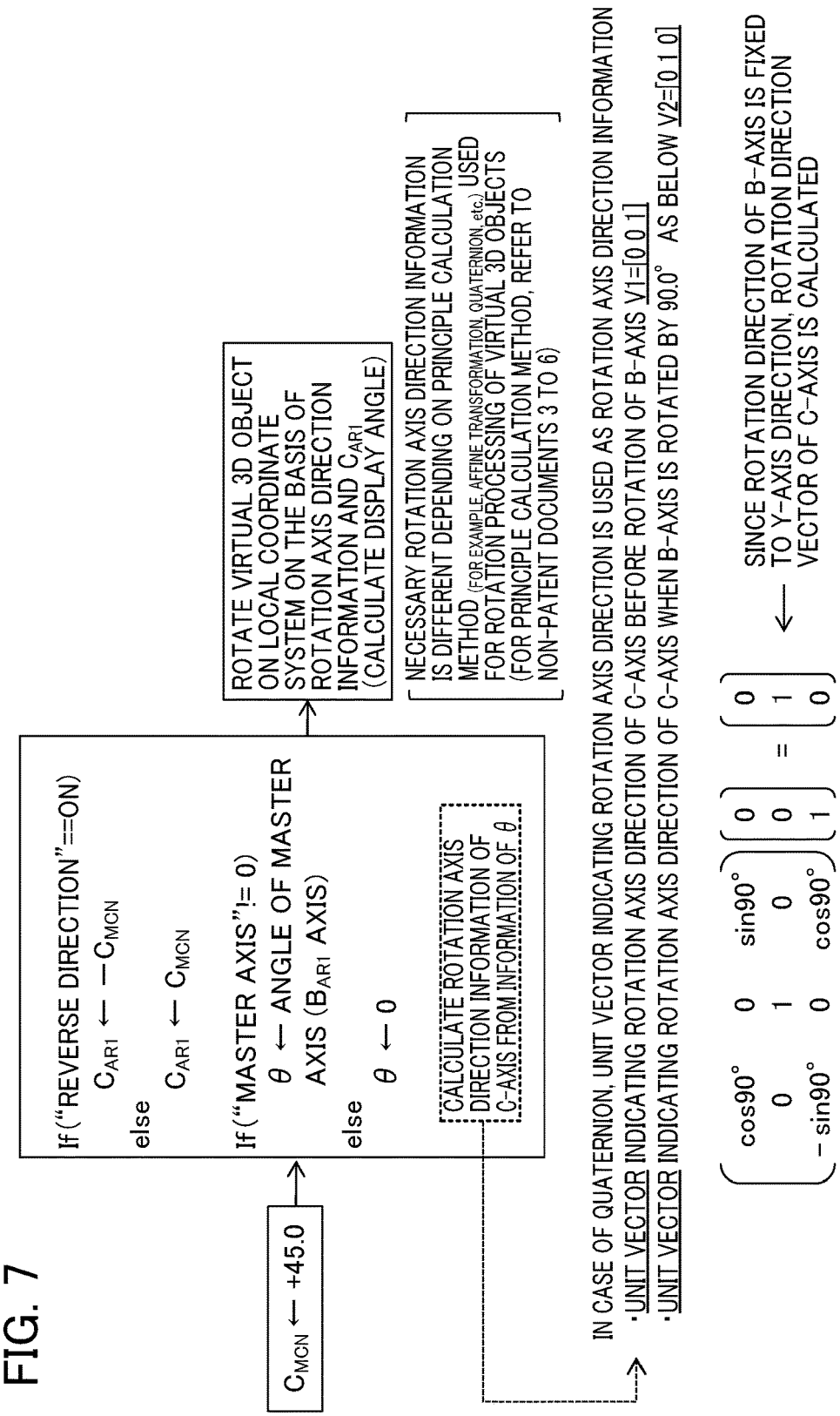
FIG. 7 is a diagram (2/2) illustrating conversion of a conversion unit according to an embodiment of the present invention.

Next, conversion from the movement amount in the MCN coordinate system to the movement information in the AR coordinate system performed by the conversion unit 220 after the above-described setting is performed will be described with reference to FIGS. 6 and 7. First, linear movement (that is, a linear axis along which linear movement is performed) will be described with reference to FIG. 6.

In this example, a case in which a conversion target virtual 3D object is "virtual 3D object 1" described with reference to FIG. 5, the relation information is set as described with reference to FIG. 5, and the movement amount of the control axis X1 is converted to the corresponding movement information in the AR coordinate system X will described.

In the case of movement in the normal direction along the linear axis, the movement amount $X_{MCN}$ of the linear axis output from the numerical controller 100 is converted to $X_{AR1}$ according to the relation information set as described with reference to FIG. 5 and is output to the extension information calculation unit 230.

The extension information calculation unit 230 moves the origin of the local coordinate system of the virtual 3D object 1 by a movement amount of $X_{AR1}$ on the basis of the input value $X_{AR1}$ to generate extension information display data. In this way, the display position of the virtual 3D object 1 is moved in correspondence to the conversion of the conversion unit 220.

If a check mark is filled in "Reverse direction" which is "Item: 5" in FIG. 5, the movement amount of $X_{AR1}$ has a value corresponding to the reverse direction. That is, if the movement amount $X_{MCN}$ of the linear axis is "+10.0", $X_{AR1}$ is converted to "+10.0" when a check mark is not filled in "Reverse direction" whereas $X_{AR1}$ is converted to "-10.0" when a check mark is filled in "Reverse direction". Moreover, if X1 is set to the linear axis of the AR coordinate system Y in "Target axis" which is "Item: 3" in FIG. 5, the movement amount $X_{MCN}$ of the linear axis is converted to $Y_{AR1}$. Next, rotational movement (that is, a rotation axis around which rotational movement is performed) will be described with reference to FIG. 7.

In this example, a case a conversion target virtual 3D object is "Virtual 3D object 1" described with reference to FIG. 5, the relation information is set as described with reference to FIG. 5, and the movement amount of the control axis C1 is converted to the corresponding movement information in the AR coordinate system C will be described.

The movement amount $C_{MCN}$ of the rotation axis output from the numerical controller 100 is converted to $C_{AR1}$ according to the relation information set as described with reference to FIG. 5. In this case, if a check mark is filled in "Reverse direction" which is "Item: 5" in FIG. 5, the movement amount of $C_{AR1}$ has a value corresponding to the reverse direction. Moreover, the angle θ of the master axis is specified.

As illustrated in FIG. 5, in the case of the AR coordinate system C, the target axis is C1 and the master axis is B1. In this case, "θ←Master axis ($B_{AR1}$ axis) angle". Moreover, as illustrated in FIG. 5, in the case of the AR coordinate system B, the target axis is B1 and the master axis is not present. In this case, "θ←0".

Subsequently, rotation axis direction information of the C-axis is calculated from the information of the master axis θ. The calculated rotation axis direction information is different depending on a principle calculation method (for example, quaternion or affine transformation) used for rotation processing of virtual 3D objects. Examples of these principle calculation methods are disclosed in Non-Patent Documents 3 to 6, for example. More specifically, Non-Patent Document 3 mainly discloses affine transformation, Non-Patent Document 4 mainly discloses the Euler angle, and Non-Patent Documents 5 and 6 mainly disclose quaternion.

For example, in the case of quaternion, a unit vector indicating a rotation axis direction is used as the rotation axis direction information. For example, as illustrated in the drawing, a unit vector indicating a rotation axis direction of the C-axis before the B-axis rotates is calculated as V1=[0 0 1], and a unit vector indicating a rotation axis direction of the C-axis when the B-axis is rotated by 90.0° is calculated as V2=[0 1 0]. The conversion unit 220 outputs the rotation axis direction information generated by the conversion and the movement amount $C_{AR1}$ to the extension information calculation unit 230.

The extension information calculation unit 230 generates extension information display data so that the virtual 3D object rotates on the local coordinate system so as to correspond to the rotation axis direction information and the movement amount $C_{AR1}$. In this way, the virtual 3D object 1 rotates in correspondence to the conversion of the conversion unit 220.

Figure 20:
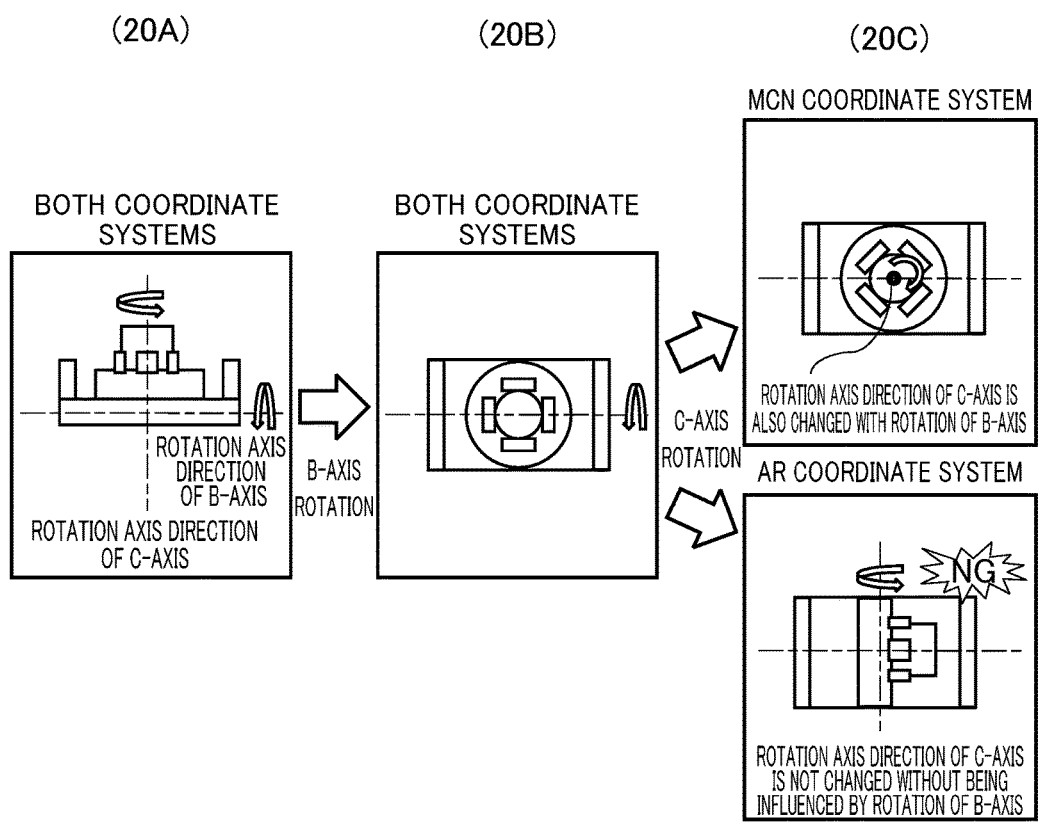
FIG. 20 is a diagram illustrating a problem when a plurality of virtual 3D objects is correlated with a marker.

In this manner, by calculating the rotation axis direction information during conversion of the conversion unit 220, it is possible to solve such a problem that the rotation axis direction of the C-axis is not changed without being influenced by rotation of the B-axis in the AR coordinate system as described with reference to (20C) on the right side of FIG. 20.

This will be described with reference to a specific example illustrated in FIG. 8. As indicated by (8A) on top of FIG. 8, the C-axis is mounted on the B-axis in a real machine tool.

Figure 8:
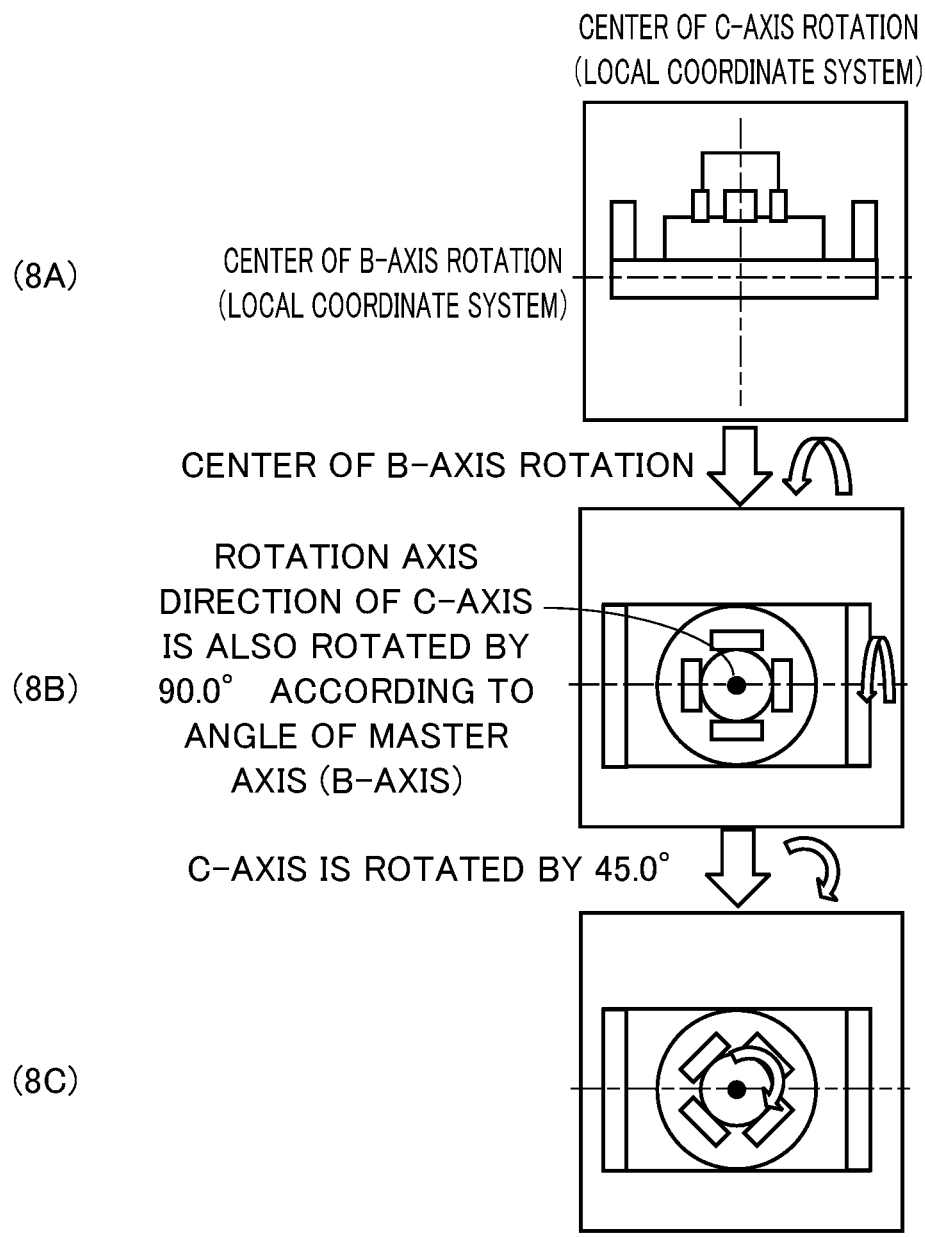
FIG. 8 is a diagram illustrating relations with a master axis according to an embodiment of the present invention.

Therefore, as indicated by (8B) at the center of FIG. 8, when the B-axis is rotated by 90.0°, for example, the rotation axis direction of the C-axis is also rotated by 90.0° and is changed.

As indicated by (8C) at the bottom of FIG. 8, when the C-axis is rotated by 90.0° from this state, the rotation axis direction of the C-axis is also changed by being influenced by rotation of the B-axis. In this way, it is possible to realize rotational movement as expected. That is, the above-described problems can be solved. Next, a specific use example of the present embodiment will be described with reference to FIG. 9.

Figure 9:
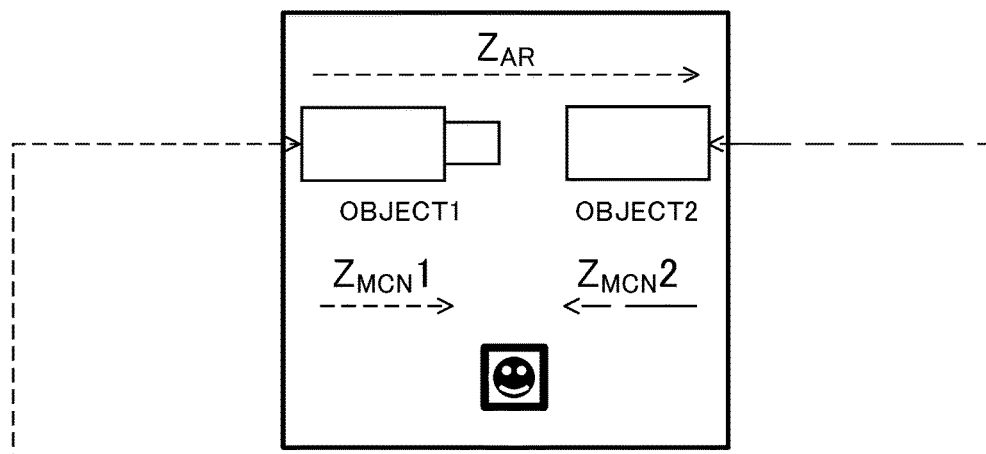
FIG. 9 is a diagram illustrating another example of a relation information setting screen according to an embodiment of the present invention.

In the example of FIG. 9, a plurality of virtual 3D objects is displayed. In this case, processes which take the world coordinate system and the local coordinate system into consideration are performed on the respective virtual 3D objects as described with reference to FIGS. 3 and 4.

When a virtual 3D object is interlocked with movement of the numerical controller 100, the relation information between the control axis and the virtual 3D object is set as illustrated at the bottom of FIG. 9.

The respective functional blocks included in the extension information controller 200 perform the above-described processes, whereby the respective virtual 3D objects move on the AR coordinate system with movement of the control axes corresponding to the virtual 3D objects. In this case, a reverse direction flag is set to a target axis Z2 of Object 2. Therefore, the object moves in a reverse direction on the AR coordinate system by the movement amount received from the numerical controller 100. The present embodiment described above provides the following advantages.

In the present embodiment, the conversion unit 220 converts the movement amount in the MCN coordinate system to the movement information in the AR coordinate system. Moreover, the extension information calculation unit 230 generates extension information display data on the basis of the movement information in the AR coordinate system after the conversion. The head-mounted display 300 displays extension information so as to be superimposed on the machine tool 400 on the basis of the extension information display data.

In this way, it is possible to interlock the numerical controller 100 with the augmented reality-based virtual 3D objects. Therefore, the user can observe the state of machining simulation.

Moreover, in the present embodiment, since a camera's capturing direction for acquiring a characteristic point (for example, a marker) can be changed, it is possible to observe objects while changing a view point. That is, according to the present embodiment, it is possible to realize machining simulation more closer to the reality than the case of using the technology disclosed in Patent Document 2.

Furthermore, in the present embodiment, a user can execute machining simulation by simple preparation and setting only: such preparation as described with reference to FIG. 4; and such setting as described with reference to FIG. 5.

Furthermore, in the present embodiment, as illustrated in FIG. 9, when a plurality of 3D objects is captured by one marker, it is possible to move the plurality of 3D objects so as to spread apart.

Moreover, in the present embodiment, since the virtual 3D object is displayed so as to be superimposed on the real machine tool 400, it is not necessary to realize all elements configuring the machine tool 400 as virtual 3D objects. That is, it is not necessary to create full computer graphics (CG) unlike the conventional technology. Due to this, even when a plurality of types of machine tools 400 is present, it is possible to easily realize machining simulations of the respective machine tools. In this way, it is possible to reduce the cost and the work period. This will be described with reference to FIGS. 10 and 11.

Figure 10:
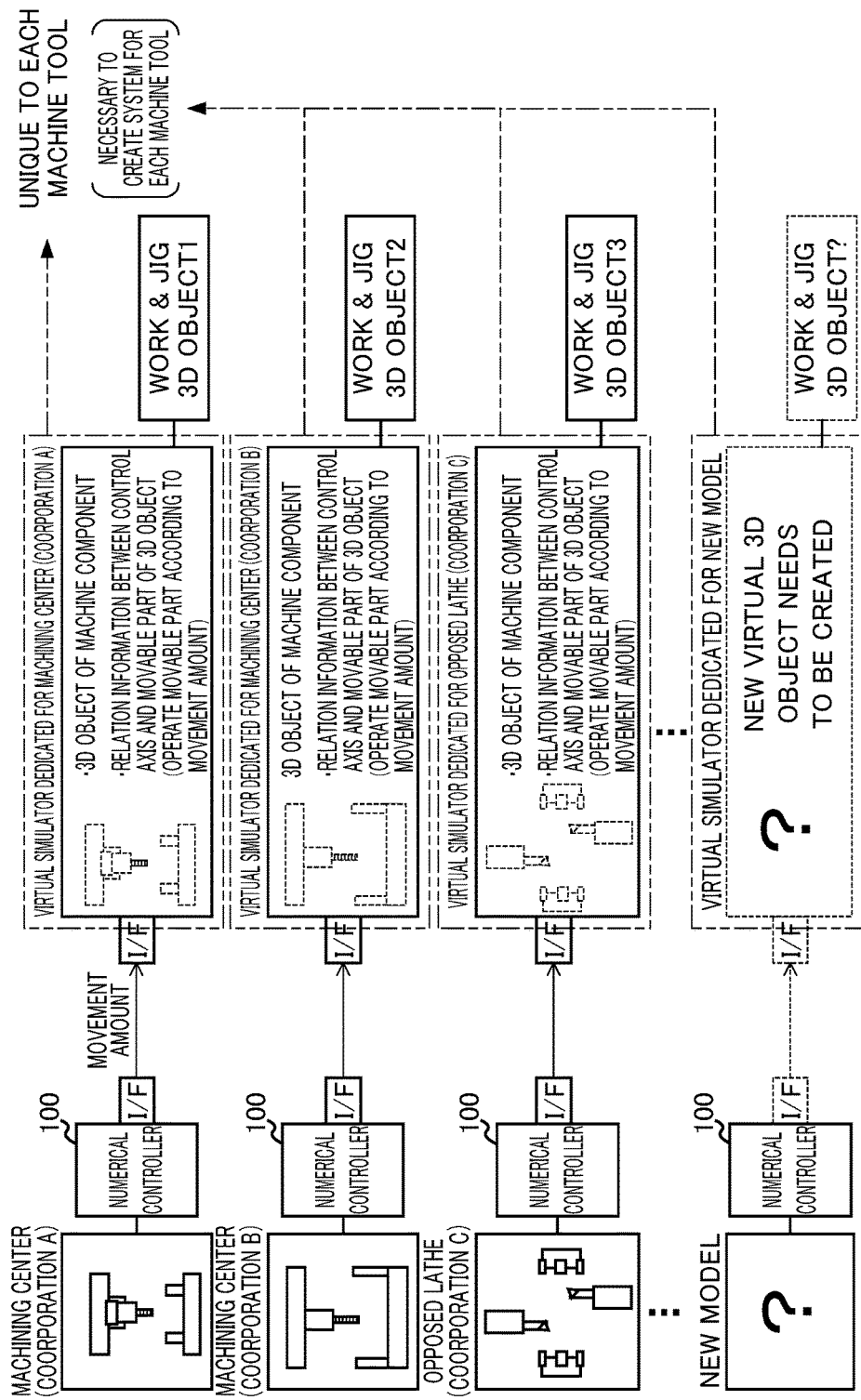
FIG. 10 is a diagram (1/2) for describing one of advantages of an embodiment of the present invention.

As illustrated in FIG. 10, a case in which different machine tools 400 (for example, a machining center manufactured by Corporation A and an opposed lathe manufactured by Corporation C) are connected to respective numerical controllers 100 will be considered. In this case, in the conventional technology, it is necessary to create virtual 3D objects for these respective different machine tools 400. Moreover, after that, when a new model is manufactured, it is necessary to create another virtual 3D object of this new model. That is, it is necessary to create virtual 3D objects unique to the respective machine tools 400.

In contrast, in the present embodiment, the above-described processes are performed by a combination of the extension information calculation unit 230 having general functions of an augmented reality technology and the relation information acquisition unit 210 and the conversion unit 220 which have a configuration unique to the present embodiment.

In this way, even when the numerical controller 100 that controls an arbitrary machine tool 400 and the extension information controller 200 are connected, it is possible to realize machining simulation.

That is, according to the present embodiment, it is possible to perform machining simulation on an arbitrary machine tool 400 using one configuration (an application for realizing the configuration).

Hereinabove, the present embodiment has been described. The above-described embodiment is a preferred embodiment of the present invention. However, the scope of the present invention is not limited to the embodiment only but the present invention can be embodied in various modifications without departing from the spirit of the present invention. For example, the present invention can be modified in modifications to be described below.

[First Modification]

Figure 12:
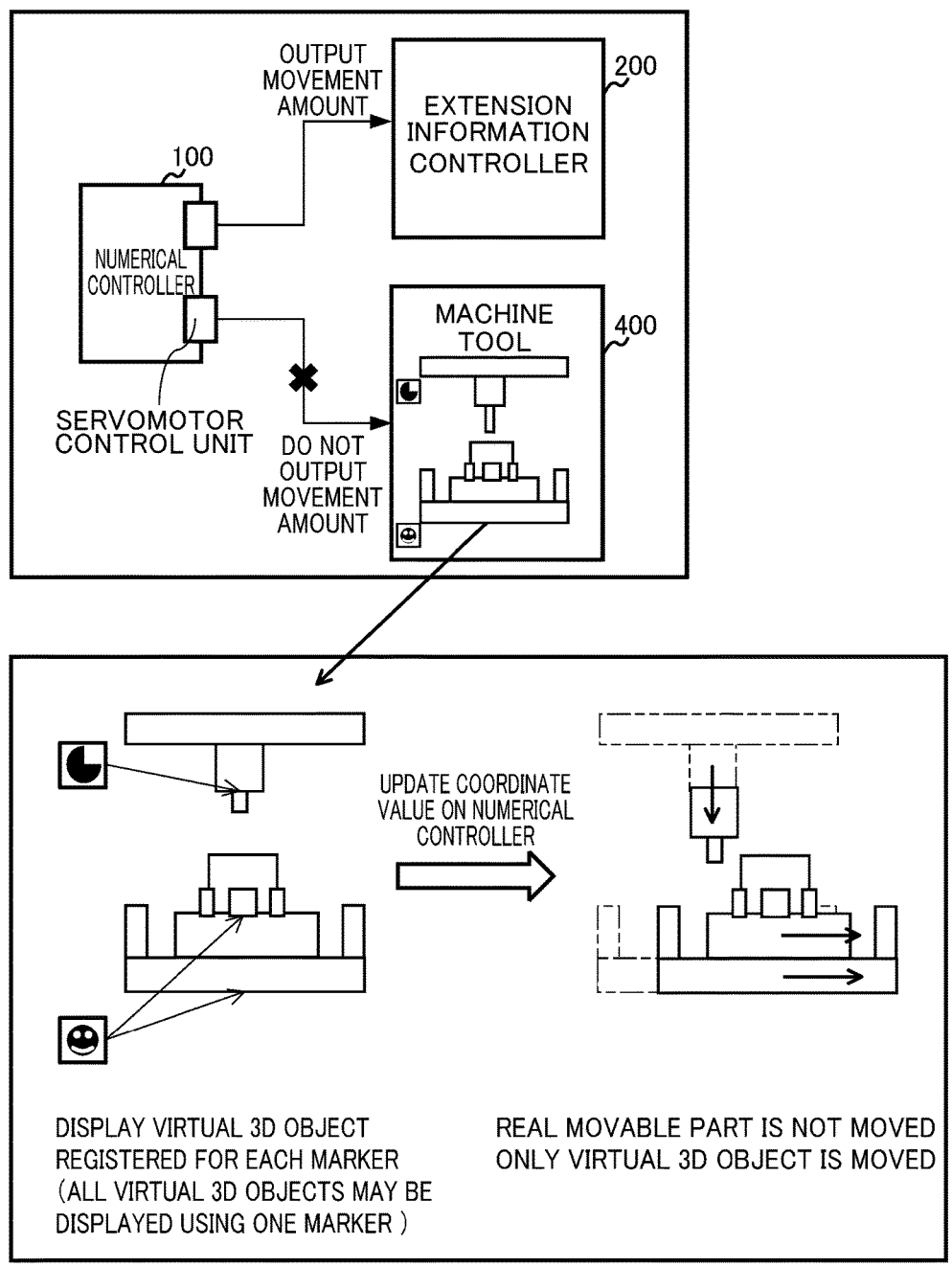
FIG. 12 is a diagram (1/2) for describing a plurality of markers and the like according to a first modification of the present invention.

A first modification of the present invention will be described with reference to FIGS. 12 to 14. In this modification, machining simulation is realized based on interlocking with the MCN coordinate value of the machine tool 400 without moving a movable part of the machine tool 400. Therefore, in this modification, as illustrated at the top of FIG. 12, the movement amount in the MCN coordinate system is not output to the machine tool 400. In this way, it is possible to move a virtual 3D object only without moving a real movable part of the machine tool 400.

Moreover, in this modification, a plurality of markers is prepared for displaying virtual 3D objects. As illustrated at the bottom of FIG. 12, one or a plurality of virtual 3D objects are displayed on each of the plurality of markers. Each of the plurality of markers corresponds to the first marker illustrated in FIG. 4 and is different from the second marker illustrated in FIG. 4.

When respective virtual 3D objects are displayed using a plurality of markers, it is necessary to unify the AR coordinate system (the world coordinate system in the AR coordinate system). This will be described with reference to FIG. 13. First, a main marker is determined among a plurality of markers. Markers other than the main marker are sub-markers. Subsequently, the center $P_n$ of another marker is correlated with the world coordinate system of which the origin $P_1$ is at the center of the main marker.

Figure 13:
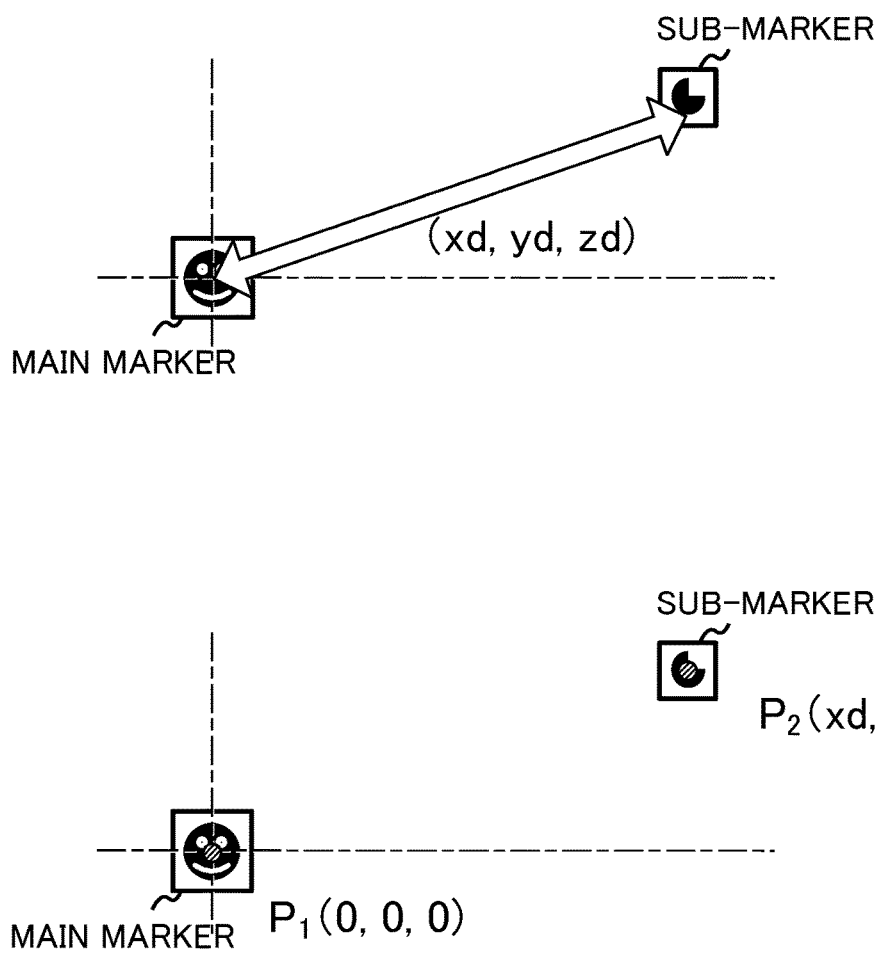
FIG. 13 is a diagram (2/2) for describing a plurality of markers and the like according to the first modification of the present invention.
Figure 14:
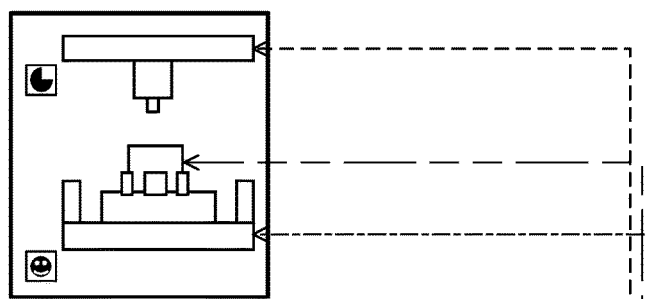
FIG. 14 is a diagram illustrating an example of a relation information setting screen according to the first modification of the present invention.
Figure 15:
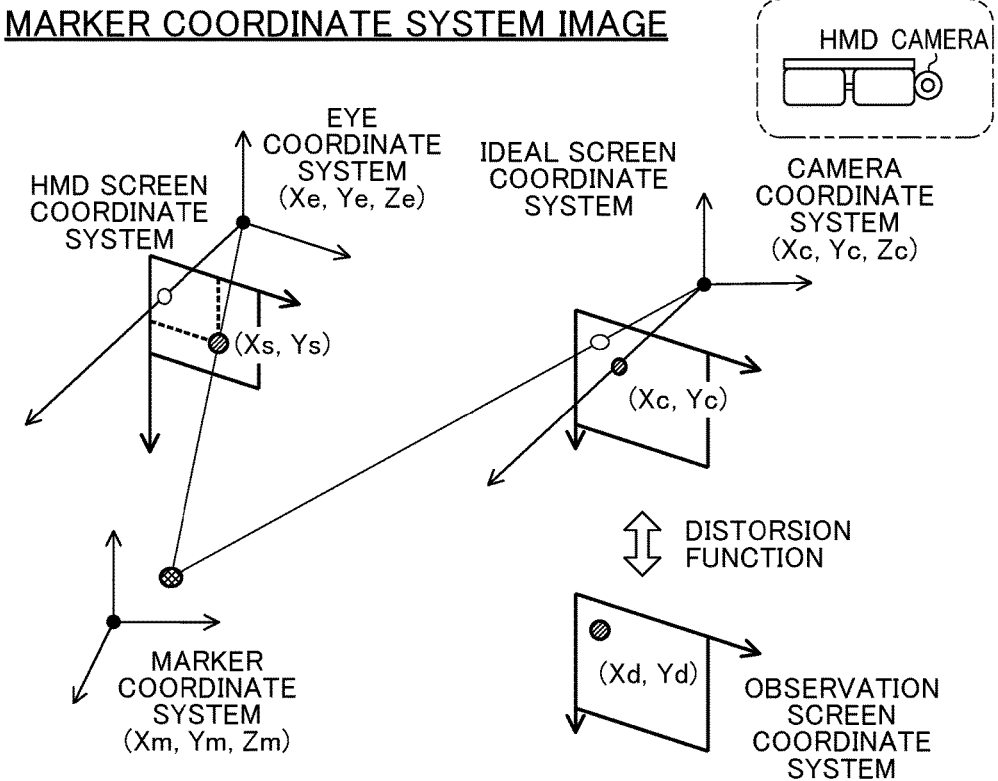
FIG. 15 is a diagram illustrating a marker coordinate system.
Figure 16:
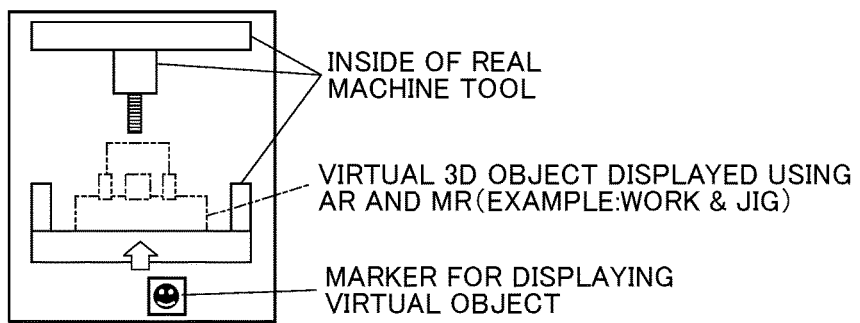
FIG. 16 is a diagram illustrating display of a virtual 3D object.
Figure 17:
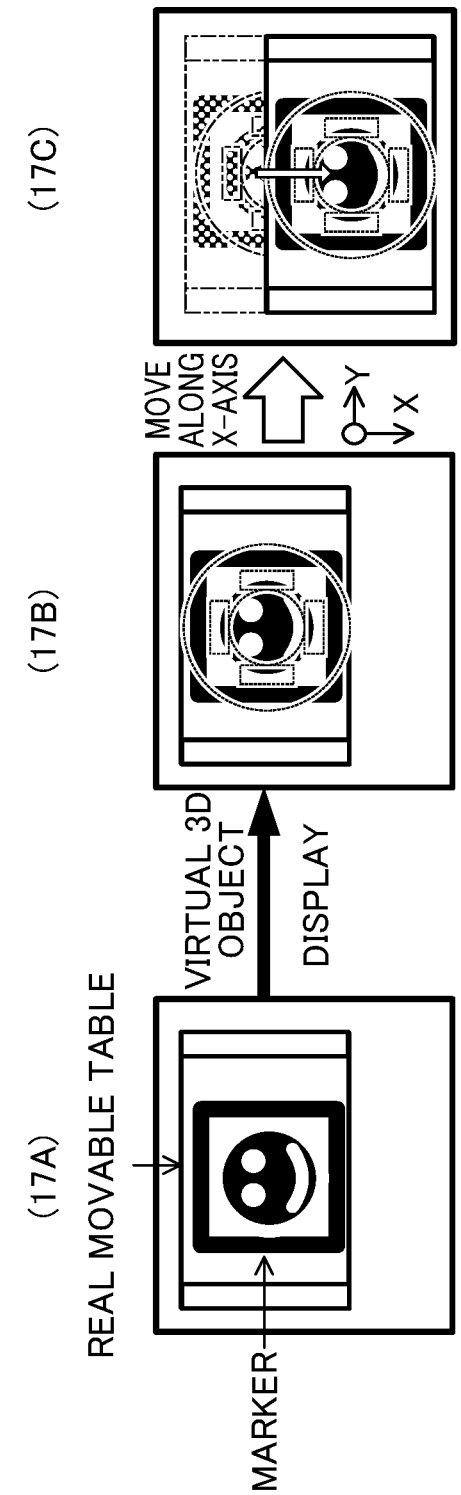
FIG. 17 is a diagram illustrating a case in which a marker is placed on a movable part.

Therefore, as illustrated at the top of FIG. 13, the distance between the main marker and each sub-marker is acquired. The distance is acquired using the technology disclosed in Non-Patent Document 2 and the like as described with reference to FIG. 4, for example.

Subsequently, as illustrated at the bottom of FIG. 13, the acquired distance is set to the center position $P_n$ of each marker on the world coordinate system. Here, since the local coordinate system of each virtual 3D object is correlated with the coordinate system of each marker, by setting the distance in this manner, it is possible to represent the position of each virtual 3D object can show the position on the same coordinate system and to check interference between virtual 3D objects.

Although a combination of a modification that the movement amount in the MCN coordinate system is not output to the machine tool 400 and a modification that one or a plurality of virtual 3D objects are displayed on each of a plurality of markers has been described, any one of the modifications may be implemented.

An example of a relation information setting screen when one or a plurality of virtual 3D objects are correlated with each of a plurality of markers will be described. This setting screen is similar to the relation information setting screen illustrated in FIG. 5. In this example, the relation between each virtual 3D object and each control axis is set as illustrated in FIG. 14.

Here, two virtual 3D objects of virtual 3D object 2 and virtual 3D object 3 are correlated with the main marker. In this case, the virtual 3D objects 2 and 3 are interlocked with a common control axis (X1, Y1, and B1). Therefore, when the movement amount in the MCN coordinate system input from the numerical controller 100 includes the movement amount of any one of X1, Y1, and B1, the conversion unit 220 may perform a conversion process with respect to each of the virtual 3D objects 2 and 3 using the method described with reference to FIGS. 6 and 7.

[Second Modification]

By combining the technologies disclosed in the present embodiment and Patent Documents 3 and 4, machining simulation more close to the reality may be implemented.

Here, the technology disclosed in Patent Document 3 takes a front-to-rear relation (depth) or the like between a real object and a virtual 3D object into consideration. By combining the technologies disclosed in the present embodiment and Patent Document 3, it is possible to display the front-to-rear relation between a virtual 3D object (for example, a work being machined) and a real object (for example, a tool) so as to be reflected on machining simulation.

Moreover, the technology disclosed in Patent Document 4 enables a virtual 3D object to be displayed continuously even when a characteristic point (for example, a marker) disappears from a camera image. By combining the technologies disclosed in the present embodiment and Patent Document 4, it is possible to continuously display the virtual 3D object even when a marker is out of a capturing range of the camera included in the head-mounted display 300.

[Third Modification]

In the above-described embodiment, as described with reference to FIG. 2 and the like, the relation information acquisition unit 210 acquires "relation information between control axes as well as the settings of control axes themselves" from the numerical controller 100. On the other hand, the relation information acquisition unit 210 acquires "relation information between control axis and virtual 3D object" on the basis of the user's setting. However, the present invention is not always limited thereto. For example, the relation information acquisition unit 210 may acquire both "relation information between control axes as well as the settings of control axes themselves" and "relation information between control axis and virtual 3D object" on the basis of the user's setting. Moreover, for example, the relation information acquisition unit 210 may acquire both "relation information between control axes as well as the settings of control axes themselves" and "relation information between control axis and virtual 3D object" from the numerical controller 100. In this case, for example, both pieces of relation information may be set in advance in the numerical controller 100.

Note that the above-described numerical controller, the extension information controller, and the machine tool can be realized respectively by hardware, software, or a combination thereof. Moreover, the augmented reality simulation method performed by cooperation of the above-described numerical controller, the extension information controller, and the machine tool can also be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

EXPLANATION OF REFERENCE NUMERALS

100: Numerical controller
200: Extension information controller
210: Relation information acquisition unit
220: Conversion unit
230: Extension information calculation unit
250: Wireless communication unit
300: Head-mounted display
400: Machine tool

What is claimed is:

1. An augmented reality simulation device comprising:
    extension information display means for displaying a virtual object so as to be superimposed on a real machine tool;
    relation information acquisition means for acquiring first relation information which is information that specifies relation between the virtual object and control axes of a numerical controller that controls the machine tool and second relation information which is information that is output from the numerical controller that specifies control settings of the control axes themselves and that also specifies an axis orientation relation between the control axes;
    conversion means for converting a movement amount in a first coordinate system which is a coordinate system of the control axis to movement information in a second coordinate system which is a coordinate system for allowing the extension information display means to display the virtual object on the basis of the first relation information and the second relation information; and
    calculation means for calculating a display position and a display angle of the virtual object on the basis of the movement information in the second coordinate system after the conversion, wherein
    the extension information display means displays the virtual object on the basis of a calculation result of the calculation means.

2. The augmented reality simulation device according to claim 1, wherein
    when the numerical controller operates the machine tool by transmitting the movement amount in the first coordinate system to the machine tool,
    the conversion means performs the conversion on the basis of the same movement amount as the movement amount in the first coordinate system transmitted to the machine tool, and the virtual object is displayed so as to be interlocked with operations of the machine tool.

3. The augmented reality simulation device according to claim 1, wherein
the calculation means calculates a distance between a first characteristic point which is the origin of the second coordinate system and a second characteristic point disposed at a machining simulation starting position of the virtual object, calculates movement information for moving the display position of the virtual object to the second characteristic point on the basis of the calculated distance, and calculates the display position of the virtual object on the basis of the calculated movement information and the movement information in the second coordinate system converted by the conversion means.

4. The augmented reality simulation device according to claim 1, wherein
when a plurality of the virtual objects is displayed at the origin of the second coordinate system, the respective virtual objects have different pieces of the first relation information.

5. The augmented reality simulation device according to claim 1, wherein
when a plurality of virtual objects are displayed at different positions,
the calculation means specifies the position of a third characteristic point in the second coordinate system on the basis of the distance between the first characteristic point which is the origin of the second coordinate system and the third characteristic point disposed at a position different from the first characteristic point, and
the calculation means calculates a display position of the first virtual object on the basis of the position of the first characteristic point and calculates the position of the third characteristic point in the second coordinate system as the display position of the second virtual object.

6. A non-transitory computer readable medium having recorded thereon an augmented reality simulation program for causing a computer to function as an augmented reality simulation device, the augmented reality simulation program causing the computer to function as the augmented reality simulation device comprising:
extension information display means for displaying a virtual object so as to be superimposed on a real machine tool; relation information acquisition means for acquiring first relation information which is information that specifies relation between the virtual object and control axes of a numerical controller that controls the machine tool and second relation information that is output from the numerical controller which is information that specifies control settings of the control axes themselves and that also specifies an axis orientation relation between the control axes;
conversion means for converting a movement amount in a first coordinate system which is a coordinate system of the control axis to movement information in a second coordinate system which is a coordinate system for allowing the extension information display means to display the virtual object on the basis of the first relation information and the second relation information; and
calculation means for calculating a display position and a display angle of the virtual object on the basis of the movement information in the second coordinate system after the conversion, wherein
the extension information display means displays the virtual object on the basis of a calculation result of the calculation means.

* * * * *